US011972297B2

(12) United States Patent
Kim

(10) Patent No.: US 11,972,297 B2
(45) Date of Patent: Apr. 30, 2024

(54) GENERATING ABSTRACTIONS FOR OFFLOADING TASKS TO HETEROGENEOUS ACCELERATORS

(71) Applicant: Microsoft Technology Licensing, LLC, Redmond, WA (US)

(72) Inventor: Daehyeok Kim, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 37 days.

(21) Appl. No.: 17/323,110

(22) Filed: May 18, 2021

(65) Prior Publication Data

US 2022/0374277 A1 Nov. 24, 2022

(51) Int. Cl.
*G06F 9/50* (2006.01)
*H04W 28/08* (2023.01)

(52) U.S. Cl.
CPC .......... *G06F 9/5044* (2013.01); *G06F 9/5055* (2013.01); *G06F 9/5066* (2013.01); *H04W 28/0933* (2020.05)

(58) Field of Classification Search
None
See application file for complete search history.

(56) References Cited

U.S. PATENT DOCUMENTS

| 10,262,390 | B1 * | 4/2019 | Sun | G06F 9/5077 |
| 2004/0064581 | A1 * | 4/2004 | Shitama | H04W 36/18 |
| | | | | 709/218 |
| 2012/0096527 | A1 * | 4/2012 | Pasternak | G06F 9/547 |
| | | | | 719/311 |
| 2013/0322270 | A1 * | 12/2013 | Ko | H04L 45/306 |
| | | | | 370/252 |
| 2017/0256023 | A1 * | 9/2017 | Li | G06F 3/0656 |
| 2018/0157531 | A1 | 6/2018 | Bobba et al. | |
| 2019/0141120 | A1 | 5/2019 | Bernat et al. | |
| 2019/0253518 | A1 * | 8/2019 | Nachimuthu | G06F 11/0715 |

(Continued)

OTHER PUBLICATIONS

"International Search Report and Written Opinion Issued in PCT Application No. PCT/US22/026245", dated Jul. 1, 2022, 14 Pages.

(Continued)

*Primary Examiner* — Michael W Ayers
*Assistant Examiner* — Zujia Xu

(57) ABSTRACT

Systems and methods are provided for offloading a task from a central processor in a radio access network (RAN) server to one or more heterogeneous accelerators. For example, a task associated with one or more operational partitions (or a service application) associated with processing data traffic in the RAN is dynamically allocated for offloading from the central processor based on workload status information. One or more accelerators are dynamically allocated for executing the task, where the accelerators may be heterogeneous and my not comprise pre-programming for executing the task. The disclosed technology further enables generating specific application programs for execution on the respective heterogeneous accelerators based on a single set of program instructions. The methods automatically generate the specific application programs by identifying common functional blocks for processing data traffic and mapping the functional blocks to the single set of program instructions to generate code native to the respective accelerators.

20 Claims, 11 Drawing Sheets

(56) References Cited

U.S. PATENT DOCUMENTS

| | | | |
|---|---|---|---|
| 2019/0272174 A1* | 9/2019 | Khatri | G06F 9/30174 |
| 2021/0144198 A1* | 5/2021 | Yu | H04W 28/0967 |
| 2022/0188086 A1* | 6/2022 | Yamato | G06F 8/4452 |
| 2022/0276914 A1* | 9/2022 | Kundu | G06F 9/4881 |

OTHER PUBLICATIONS

Office Action Received for European Application No. 22724288.0, mailed on Jan. 3, 2024, 3 pages.

* cited by examiner

400A →

| Task 402 | Type 404 | Processors 406 |
|---|---|---|
| CP | Layer One | CPU |
| FFT/iFFT | Layer One | CPU, FPGA |
| Demap/map | Layer One | CPU, FPGA |
| Channel/precode | Layer One | CPU, GPU |
| Eq/layer | Layer One | CPU, GPU |
| Demod | Layer One | CPU, GPU |
| Mode | Layer One | CPU, GPU |
| Descram | Layer One | CPU, GPU |
| Scram | Layer One | CPU, GPU |
| Rate | Layer One | CPU, GPU, FPGA |
| Decoding/coding | Layer One | CPU, GPU, FPGA |
| CRC | Layer One | CPU, GPU |
| Low-MAC | Layer Two | CPU, GPU |
| High-MAC | Layer Two | CPU, GPU |
| Low-RLC | Layer Two | CPU, GPU |
| High-RLC | Layer Two | CPU, GPU |
| Service App (first) | Application | CPU, GPU |
| Service App (second) | Application | CPU |

| Processor 420 | Tasks 422 | Available Workload 424 | Cluster 426 |
|---|---|---|---|
| CPU | general | 40% | |
| GPU (first) | CRC, rate | 60% | |
| GPU (second) | FFT/iFFT | 50% | |
| GPU (third) | Location Service | 50% | |
| FPGA (first) | decoding/coding | 10% | 01 |
| FPGA (second) | decoding/coding | 10% | 01 |
| FPGA (third) | demod/mod | 60% | |

| Server ID 440 | Processor 442 | Tasks 444 | Cluster 446 |
|---|---|---|---|
| 01 | CPU | | |
| 01 | GPU (first) | | |
| 01 | GPU (second) | | |
| 01 | FPGA (first) | demod/mod | |
| 01 | FPGA (second) | decoding/coding | 02 |
| 02 | CPU | | |
| 02 | GPU (first) | | |
| 02 | GPU (second) | | |
| 02 | FPGA (first) | decoding/coding | 02 |

FIG. 4C

GENERATING ABSTRACTIONS FOR OFFLOADING TASKS TO HETEROGENEOUS ACCELERATORS

BACKGROUND

Demand for integration between a cloud network and a radio access network (RAN) and/or a core network for wireless telecommunications has rapidly increased. The RAN provides wireless connectivity to mobile computing devices by converting data into data packets. The core network coordinates among various parts of the RAN and provides connectivity to a packet-based network (e.g., the Internet). Traditional wireless telecommunications deployed servers with hardware that was specialized to particular types of processing and was typically built with a capacity to accommodate an estimated peak load of the network traffic. Use of cloud network technology, particularly virtual server technologies, has enabled decoupling of at least some wireless data processing from specialized hardware onto general-purpose servers. The general-purpose servers, combined with accelerators and the virtualization technologies, are able to dynamically change resource usage based on non real-time and near real-time network demands.

With the advent of 5G, which is a system of mobile communications that improved upon aspects of the previous 4G system (reduced latency, increased bandwidth, etc.), the scope of mobile networks has increased to provide a broad range of wireless services delivered across multiple platforms and multi-layer networks. 5G specifications outline a host of performance requirements related to bandwidth, peak data rate, energy efficiency, reliability, latency (both user-plane and control-plane latency), traffic capacity, etc. To meet these requirements, the RAN architecture has expanded. For instance, Multi-Access Edge Computing (MEC) brings applications from centralized data centers to the network edge, closer to end users. MEC provides low latency, high bandwidth, and real time access to RAN information. Distributing computing power enables the high volume of 5G devices and facilitates disaggregated, virtual RANs to create additional access points. Network Function Virtualization (NFV) replaces network functions like firewalls, load balancers, and routers with virtualized instances that run as software. Enhanced Common Public Radio Interface (eCPRI) can be used, for instance, for the fronthaul interface of a cloud RAN (e.g., for the real-time processing by the distributed unit (DU)).

A wireless telecommunication network is based on physical and geographical constraints. For example, cell towers, which provide cellular wireless coverage areas for mobile devices (e.g., smartphones), need to be physically distributed. Network switches and servers, which process radio signals from cell towers into electrical or optical signals, need to be physically co-located or within a geographic range of each cell tower. The switches and the RAN servers need to process and route the cellular data traffic in real-time, where this processing is associated with at least layer one (i.e., the physical layer) and potentially layer two (the Media Access Control (MAC)) of the OSI seven-layer network model. In contrast to the RAN servers, which process highly time-sensitive layer-one data traffic, core-network servers process packetized data (e.g., IP data packets) with less stringent latency constraints (e.g., billing and user management). However, servers in the core network also process at least some data requiring near-real-time processing (e.g., video streams). This time-sensitive processing is prioritized by the core-network servers over processing other types of data. Even so, with eased latency constraints, servers in the core network can be located farther away from the cell towers at regional centers, while still ensuring a quality of service and near real-time performance to comply with service level requirements.

In contrast to servers in the core network, which are able to leverage cloud technologies for virtual resource allocation to improves resource utilization, RAN servers are limited by physical constraints (e.g., geographical and dimensional limitations) as well as the real-time processing requirements, which curtails the extent these servers can rely on cloud resource allocation technologies provided by large, remote regional data centers. In part to overcome this issue, RAN servers may be equipped with a variety of accelerators for processing the data traffic in layer one and layer two, in addition to a central processing unit (CPU or a central processor). Accelerators provide processing capabilities without consuming resources from the CPU; however, accelerators are often programmed to handle only a certain type of data. As a result, these accelerators may be referred to as "heterogeneous" accelerators. For example, some accelerators (e.g., Application-Specific Integrated Circuit (ASIC)) are designed for a specific type of data processing. Some other accelerators (e.g., Field Programmable Gate Array (FPGA)) are programmable for executing a variety of functions, such as decoding and encoding data and processing video stream data.

Resource management at the RAN servers presents an issue because the volume of data traffic is inconsistent and includes bursts of high traffic, resulting in variable real-time processing demands over time. As noted above, to ensure consistent compliance with latency constraints while confronting inconsistent processing demands, RAN servers are configured with a processing capacity to meet an estimated peak traffic load. Accordingly, during off-peak times, resource utilization rates may be relatively low—with some resources even being idle. However, maintaining these RAN processing resources in an idle state—even intermittently—is an inefficient and expensive use of resources which are already physically constrained.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by offloading processing tasks from a central processing unit (CPU) to other processors and accelerators on RAN servers. In particular, the disclosed technology dynamically allocates a partition of processing capacity to data traffic, dynamically allocates a cluster of heterogeneous accelerators to offload processing as necessary, and schedules tasks for execution in the allocated partition and the cluster. The disclosed technology monitors workloads of the heterogeneous accelerators and periodically reallocates the partition and the cluster.

The disclosed technology relates to RAN servers in a far-edge data center of a private cloud that interfaces with a RAN. A RAN is a part of a mobile wireless telecommunications system. The RAN, in combination with a core network, represents a backbone network for mobile wireless telecommunications. According to 5G specifications, the RAN includes a radio unit (RU), a distributed unit (DU), a central unit (CU), and a RAN intelligent controller (RIC). Cell towers transmit and receive radio signals to communicate with mobile devices (e.g., smartphones) over radio (e.g., 5G). RUs at one or more cell towers connect to a DU of a RAN server at a far-edge data center of the cloud RAN. The term "a far-edge data center" may refer to a data center at a remote location at the far-edge of a private cloud, which is in proximity of the one or more cell towers. The term "a task" may refer to a executing a service application (e.g., network monitoring, video streaming, and the like) and/or processing data associated with the data traffic. The processing of data in the data traffic may refer to processing data according to one or more allocated operational partitions in layer one, layer two, and/or layer three of the network model. Offloading tasks from a CPU of a RAN server is beneficial for a number of reasons. First, efficiency is improved by dynamically partitioning tasks and offloading applicable tasks from the CPU to specialized and/or programmable accelerators. Second, service applications, which may be less reliant on real-time data processing, can be executed to utilize otherwise idle resources at the RAN server; whereas real-time processing of RAN data traffic can be consistently prioritized. Examples of service applications include video streaming, localization tracking, and network monitoring.

A cluster of accelerators may refer to an in-server cluster or a cross-server cluster. An in-server cluster includes one or more heterogeneous accelerators associated with a single RAN server; whereas a cross-server cluster includes one or more heterogeneous accelerators across RAN servers in a far-edge data center of a private cloud RAN. A scheduler schedules the partitioned processing of data traffic by a cluster. The scheduler includes a process executed in a user space of an operating system of a RAN server.

In aspects, the layers one, two, and three respectively represent a layer associated with the Open Systems Interconnection model (OSI). The OSI model includes seven layers: layer one being a physical layer, layer two being a data link layer, layer three being a network layer, layer four being a transport layer, layer five being a session layer, layer six being a presentation layer, and layer seven being an application layer.

The disclosed technology further generates and executes a program based on a set of common programming interfaces to enable task execution on respective heterogeneous accelerators with distinct capabilities. Accordingly, the disclosed technology converts a single set of accelerator-agnostic application code into multiple application programs, each executable on a distinct accelerator of the heterogeneous accelerators. The conversion includes either mapping or translating the accelerator-agnostic application code into accelerator-specific code.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

Figure 3A:
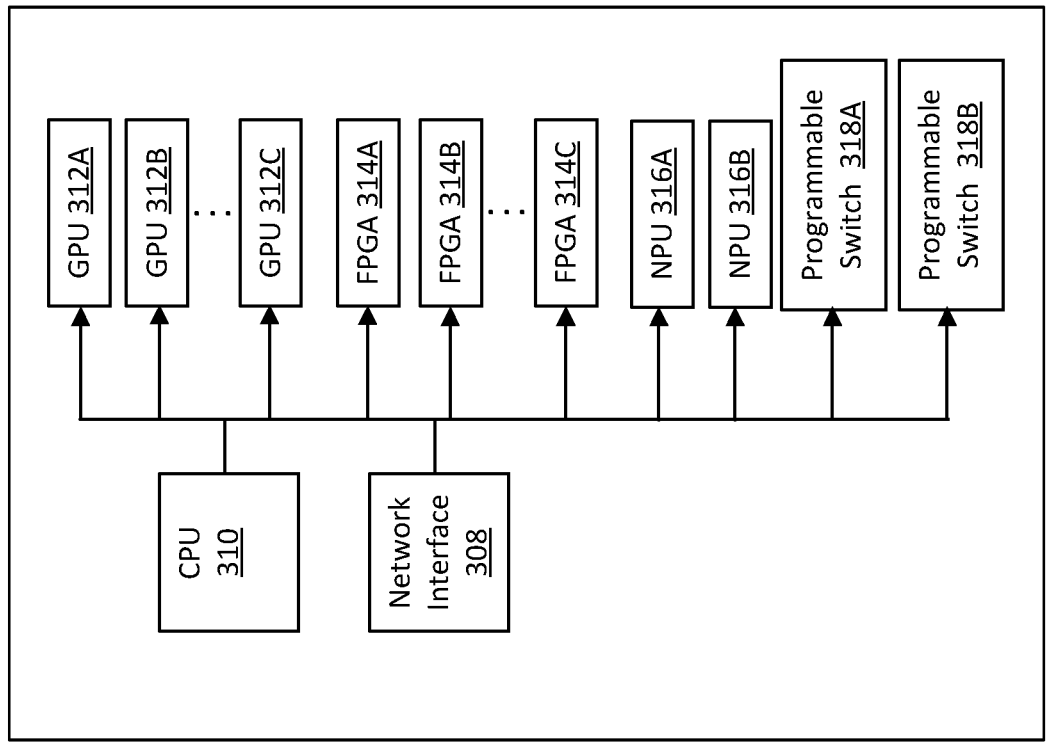
Figure 3B:
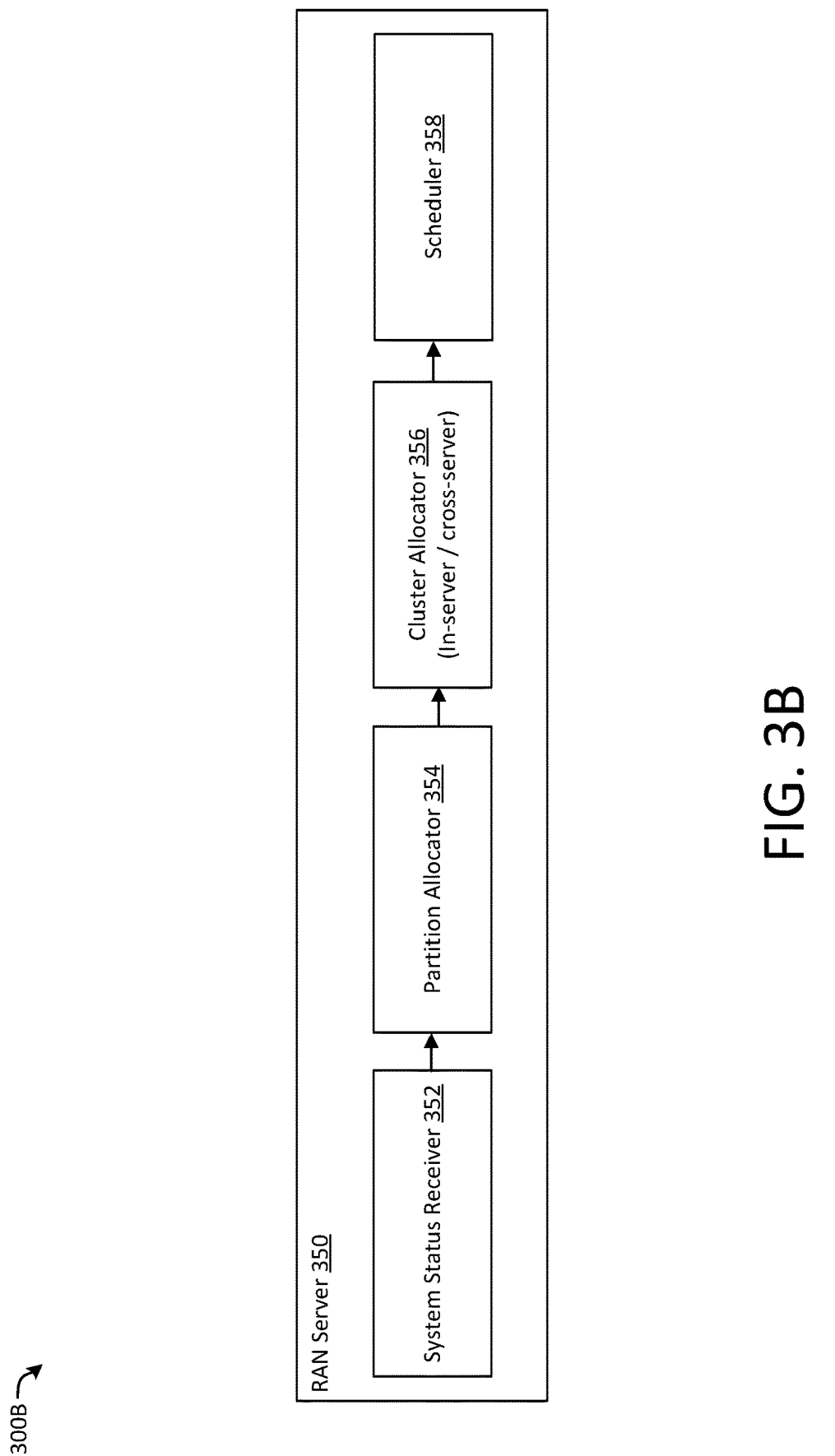

FIGS. 3A-B illustrate examples of a RAN server in accordance with aspects of the present disclosure.

FIGS. 4A-C illustrate examples of data structures associated with scheduling programs in accordance with aspects of the present disclosure.

Figure 5:
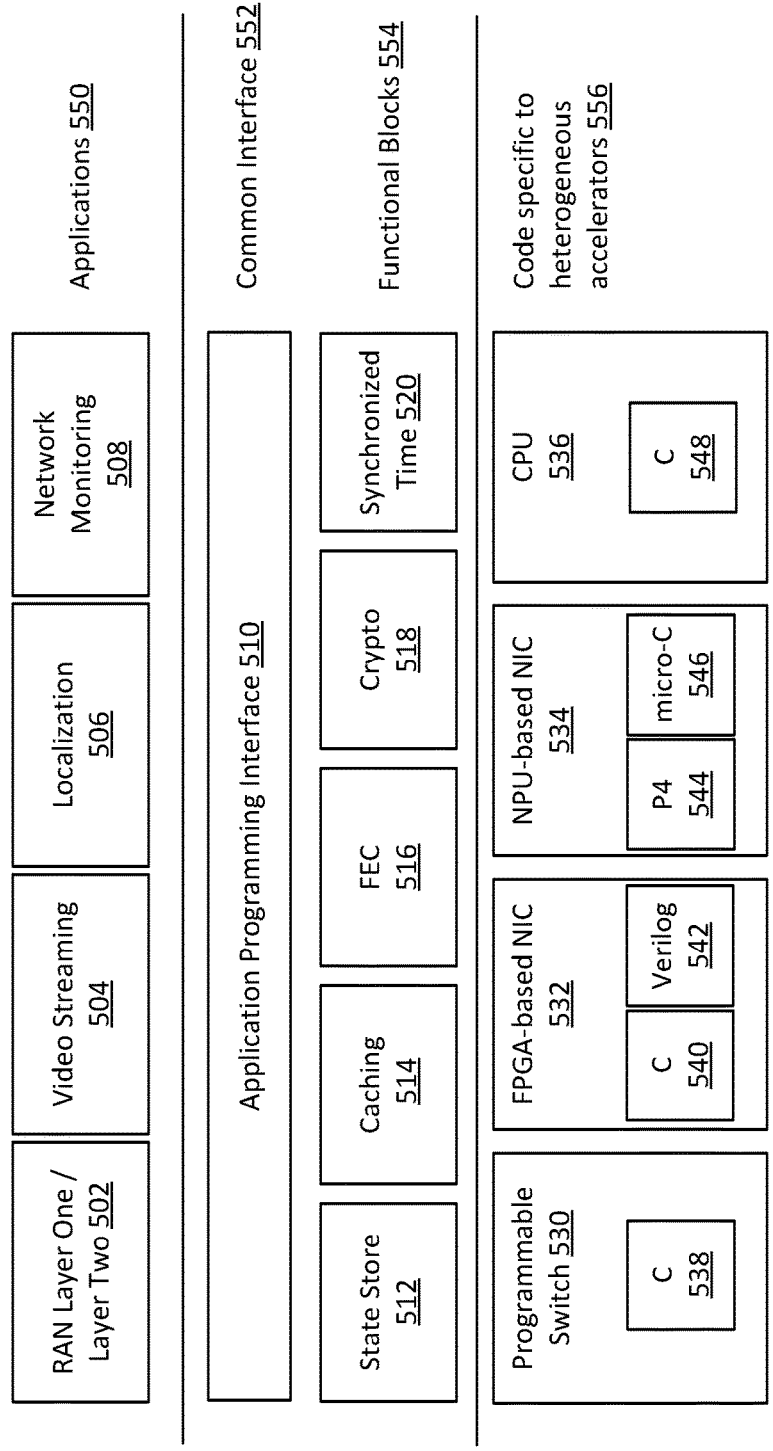

FIG. 5 illustrates an example of a structure of program instructions with a common interface in accordance with aspects of the present disclosure.

Figure 6A:
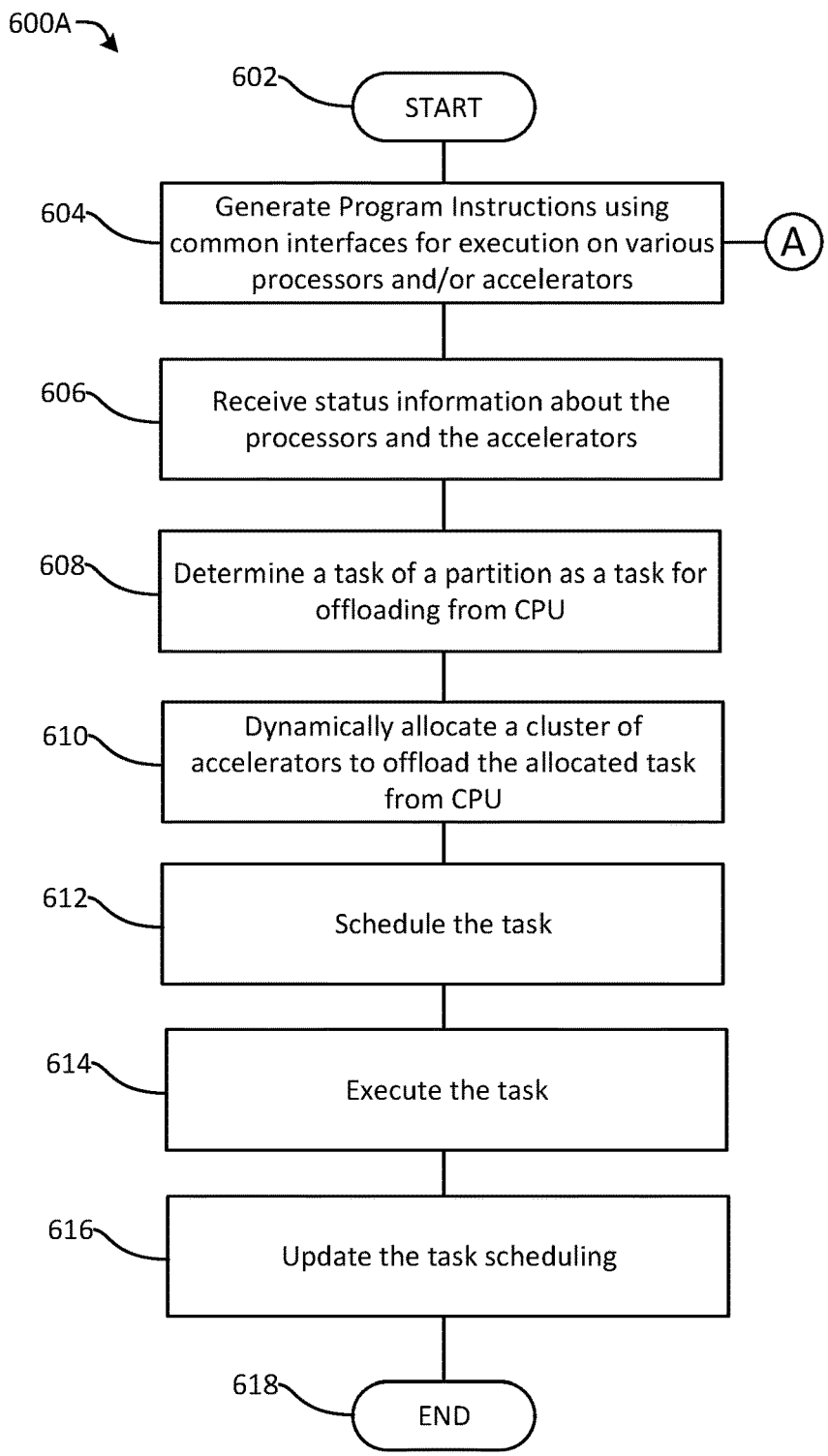
Figure 6B:
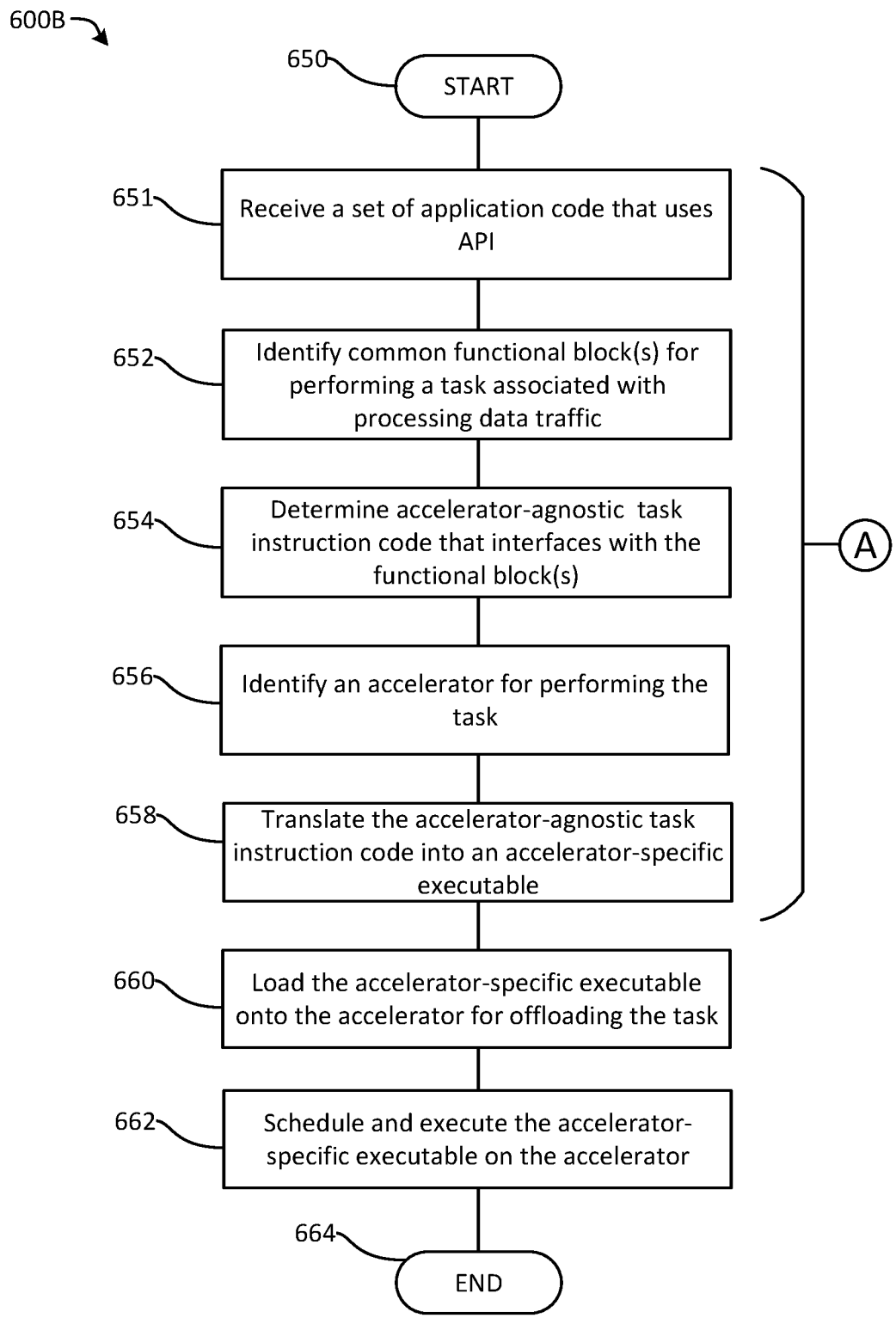

FIGS. 6A-B illustrate examples of a method for offloading tasks in accordance with aspects of the present disclosure.

Figure 7:
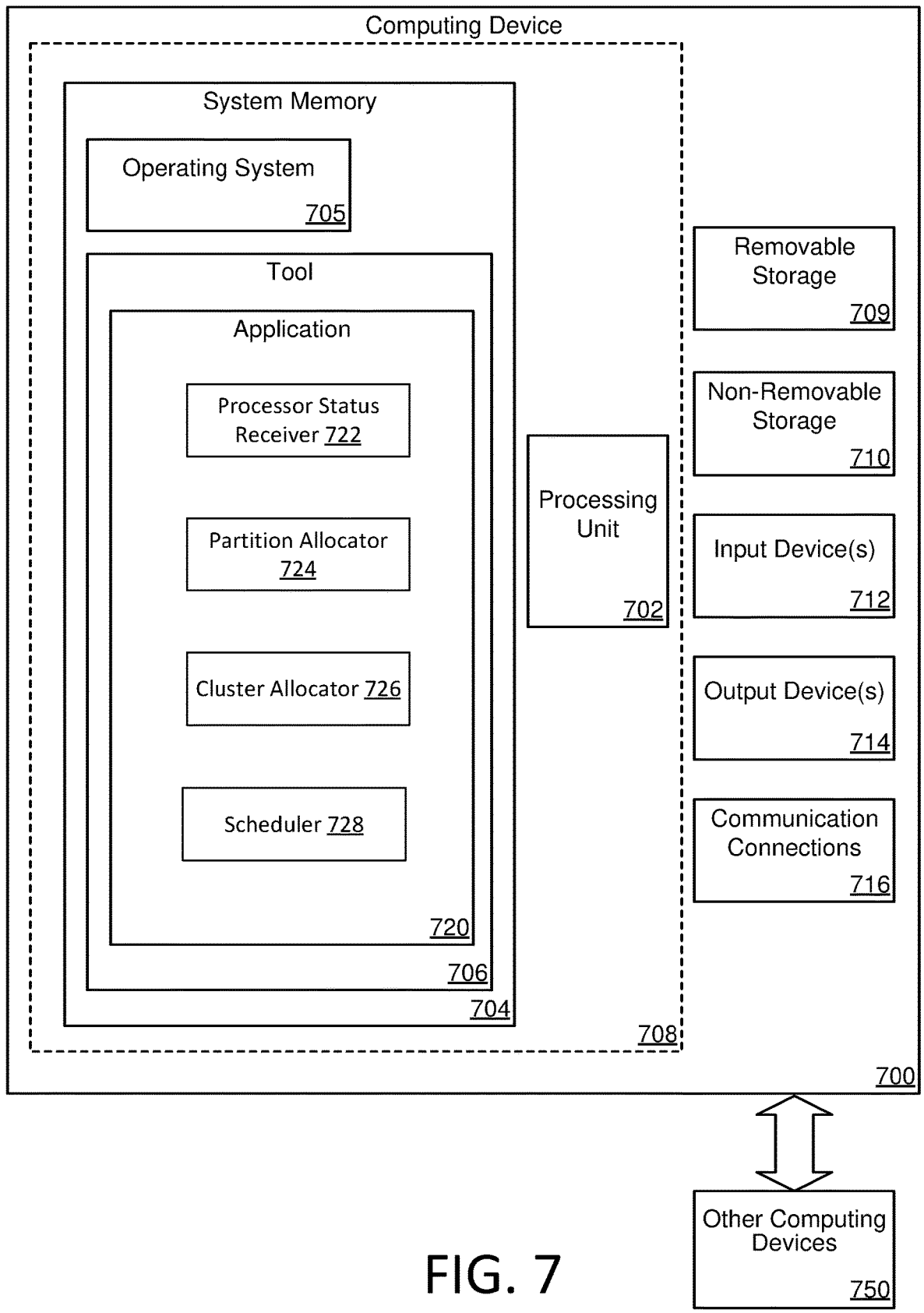

FIG. 7 is a block diagram illustrating example physical components of a computing device with which aspects of the disclosure may be practiced.

Figure 8A:
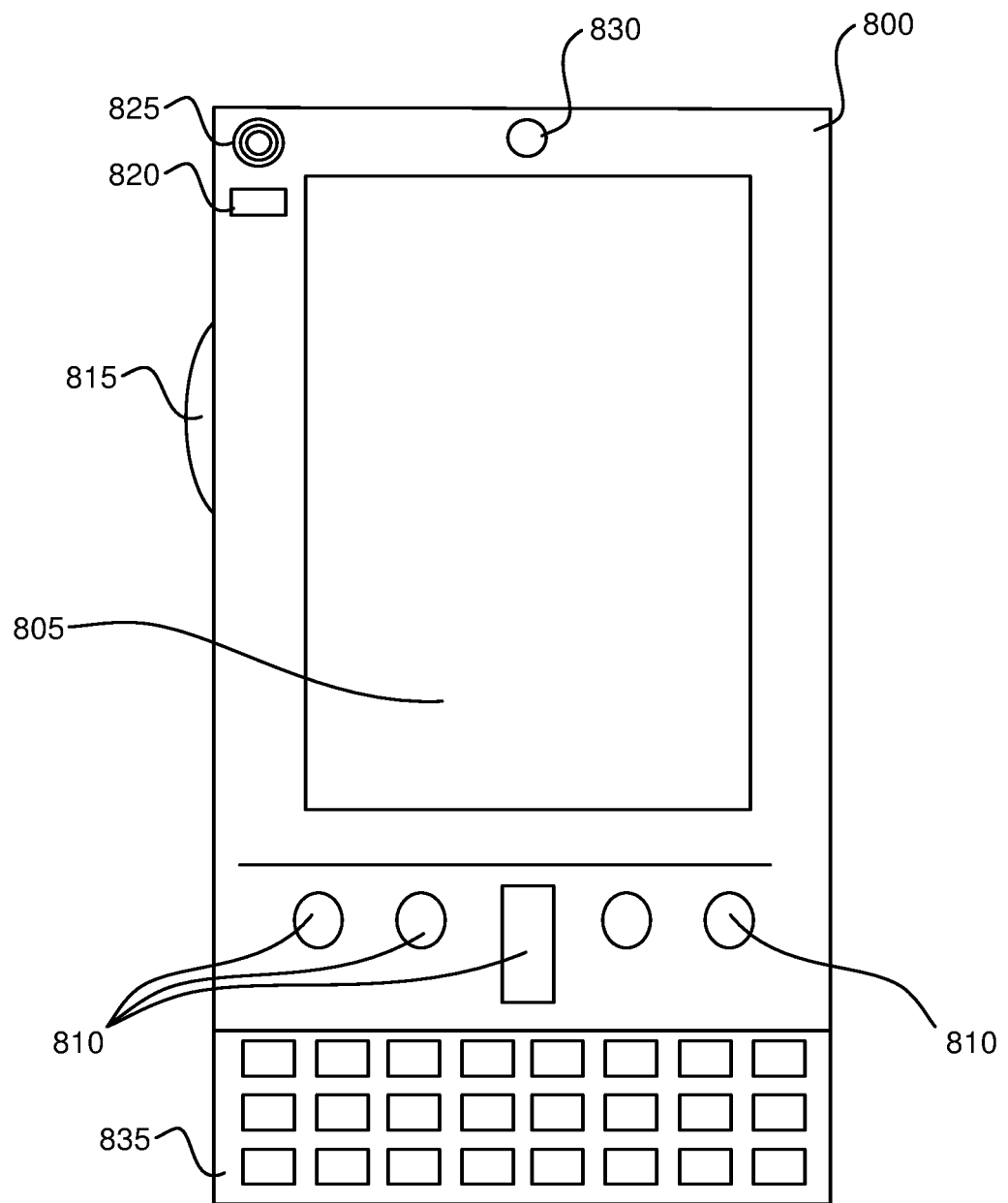

FIG. 8A is a simplified diagram of a mobile computing device with which aspects of the present disclosure may be practiced.

Figure 8B:
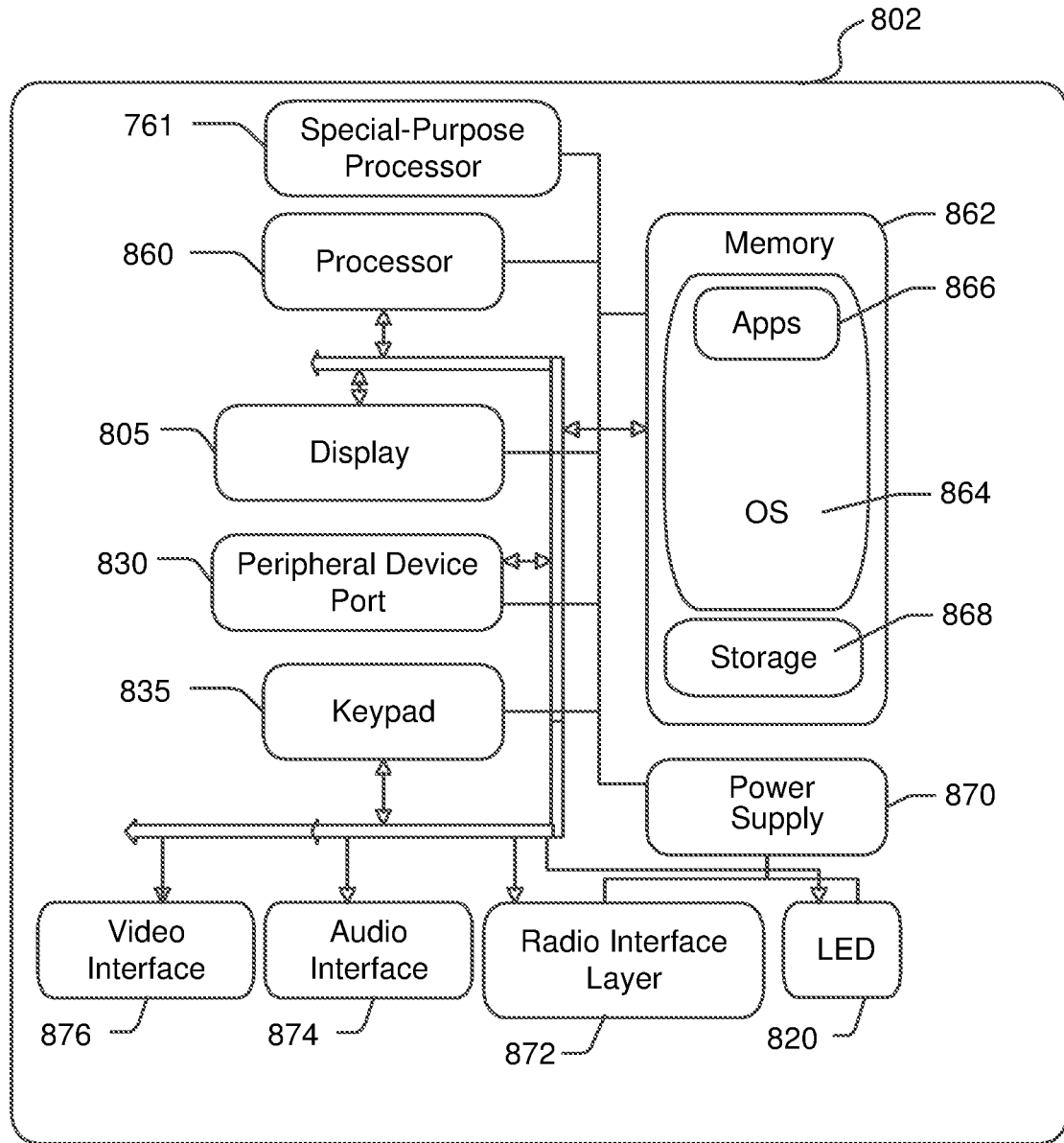

FIG. 8B is another simplified block diagram of a mobile computing device with which aspects of the present disclosure may be practiced.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

A mobile wireless telecommunication network may use a cloud service for implementing a RAN. In this case, the cloud service connects cell towers, with which mobile devices (e.g., smartphones) connect, to the public network (e.g., the Internet) and/or private networks. The cloud service provides virtual servers and other computing resources for dynamically scaling the computing capacity as needed based on the volume of data traffic. In aspects, a cloud RAN infrastructure represents an implementation of cloud services for the RAN. In contrast to a typical cloud service, the cloud RAN infrastructure includes geographical and physical constraints as well as latency constraints imposed by RAN standards. The cloud RAN includes connection to at least one cell tower associated with a Radio Unit (RU) and cloud servers associated with one or more of a Distributed Unit (DU), a Central Unit (CU), and a RAN Intelligent Controller (RIC). The cell tower is in the field, where mobile devices connect over wireless cellular communications, and the RU of the cell tower connects to a DU of a RAN server at a far-edge data center. To enable real-time processing of RAN data traffic, the far-edge data center is relatively close (e.g., a few kilometers) to the cell tower. The DU is associated with switches and one or more RAN servers. The switches and the RAN server(s) associated with the DU process data in a series of operations or partitions associated with at least layer one (i.e., the physical layer) of the Open Systems Interconnection (OSI) model.

Traditional RAN servers include a rigid design where respective accelerators (e.g., ASIC) are preprogrammed to perform specific functionalities. In contrast, the disclosed technology leverages availability of programmable accelerators to dynamically form clusters of heterogeneous accelerators for performing a variety of tasks. Furthermore, the disclosed technology describes generating and implementing abstraction models for interfacing with special-purpose accelerators to offload dynamically partitioned tasks and service applications.

As discussed in more detail below, the present disclosure relates to offloading processing of tasks from the CPU of a RAN server at a far-edge data center of a cloud RAN. Additionally or alternatively the present disclosure relates to multi-access edge computing (MEC) in a 5G telecommunication network. In particular, the RAN server offloads one or more programs from the central processing unit (CPU) to a switch and/or a cluster of heterogeneous accelerators. The RAN server dynamically allocates operational partitions associated with layer one and/or layer two processing. The RAN server further dynamically allocates a cluster (or a set) of accelerators for processing the operational partitions. A scheduler schedules and periodically re-schedules layer one tasks, layer two tasks, and/or service applications tasks for processing the partitions. The scheduler uses workload levels and available resources among the CPU and the accelerators for dynamically allocating partitions and heterogeneous accelerators. Additionally or alternatively, the scheduler dynamically allocates one or more operational partitions for offloading from the CPU to a cluster of one or more heterogeneous accelerators. In aspects, the scheduler dynamically allocates one or more partitions based on a combination of acceleratory availability and the need to offload the one or more partitions from the CPU. Some of the heterogeneous accelerators have pre-loaded instruction code for processing a predetermined operational partition. Some other accelerators may accommodate dynamically loading instruction code for performing tasks of particular operational partitions. In aspects, the scheduler includes a process executed in the user space of an operating system of the RAN server. The scheduler may be distinct from a process scheduler of the operating system, which runs in the protect mode of the operating system. The scheduler may schedule tasks in conjunction with the process scheduler of the operating system.

Figure 1:
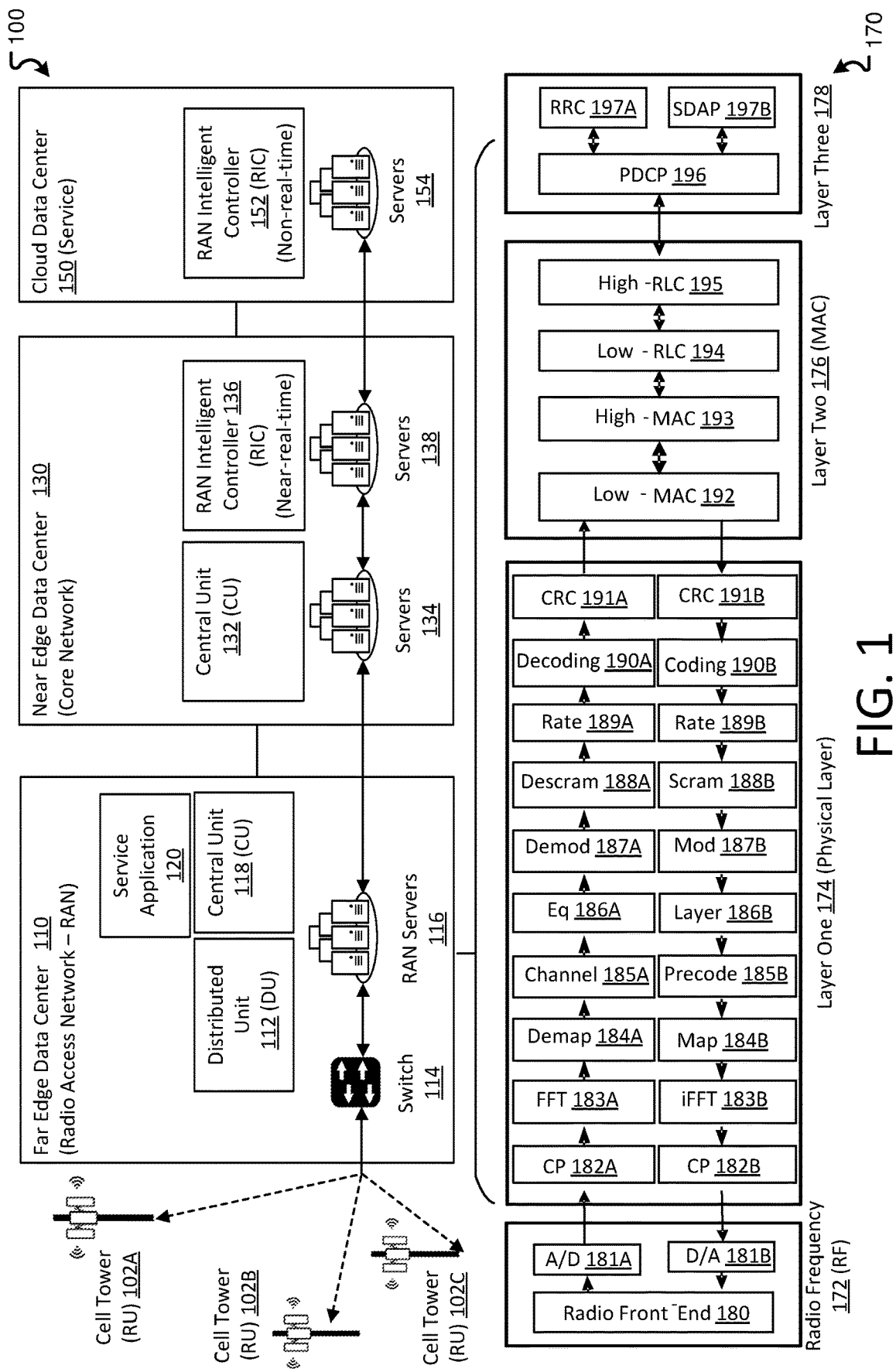
FIG. 1 illustrates an overview of an example system for offloading tasks in a RAN in accordance with aspects of the present disclosure.

FIG. 1 illustrates an overview of an example system 100 for offloading a task associated with a RAN server of a cloud service in accordance with the aspects of the present disclosure. Cell towers 102A-C transmit and receive wireless communications with mobile computing devices (e.g., smartphones) over a radio access network (RAN). The example system 100 further includes far-edge data center 110 (switches, RAN servers), near-edge data center 130 (core network servers), and cloud data center 150 (cloud services). In aspects, the example system 100 corresponds to a cloud RAN infrastructure for a mobile wireless telecommunication network.

The far-edge data center 110 is a data center that is part of the cloud RAN, which includes distributed unit 112 (DU), central unit 118 (CU), and service application 120. In aspects, the far-edge data center 110 enables cloud integration with a radio access network (RAN). The far-edge data center 110 includes a switch 114 and RAN servers 116. The switch 114 and the RAN servers 116 process incoming data traffic and outgoing data traffic associated with layer one (the physical layer) 174 and at least a part of layer two (MAC) 176. In aspects, the far-edge data center 110 is generally geographically remote from the cloud data centers associated with the core network and cloud services. The remote site is in proximity to the cell towers. For example, the proximity in the present disclosure may be within a few kilometers or more. In aspects, the upstream data traffic corresponds to data flowing from the cell towers 102A-C to servers 154 in the cloud data center 150 (service) Similarly, the downstream data traffic corresponds to data flowing from the cloud data center 150 (service) to the cell towers.

The near-edge data center 130 (e.g., hosting the core network) includes a central unit 132 (CU) and RAN intelligent controller 136 (RIC) (near real-time processing, which may be less strictly time-sensitive than real-time processing). As illustrated, CU 132 is associated with servers 134 and RIC 136 is associated with servers 138. In aspects, the near-edge data center 130 is at a regional site of a private cloud service. For example, the regional site may be about tens of kilometers from the cell towers.

The cloud data center 150 (service) includes RIC 152 (non-real-time processing) associated with servers 154. For example, RIC 152 processes non-real-time service operations. In aspects, the cloud data center 150 may be at a central location in a cloud RAN infrastructure. For example, the central locations may be hundreds of kilometers from the cell towers.

In aspects, the far-edge data center 110, which is closer to the cell towers 102A-C than the cloud data center 150, provides real-time processing. In contrast, the cloud data center 150, which is the furthest from the cell towers 102A-C in the cloud RAN infrastructure, provides processing in a non-real-time manner.

The operational partitions 170 illustrate partitions processing data traffic in the RAN. For example, the partitions may correspond to operations associated with the OSI seven-layer model. In particular, a set of partitions associated with layer one 174 (the physical layer) is the lowest layer.

In aspects, prior to processing data at layer one 174 involves conversion of data associated with a radio frequency 172 (RF). For radio frequency 172 (RF) data processing, the radio front-end partition receives and sends data through the cell towers 102A-C to mobile computing devices over wireless communications. The A/D 181A converts analog data from the radio front-end to digital data for the upstream data traffic. The D/A 181B converts digital data into analog data for the downstream data traffic.

Partitions in layer one 174 (physical layer) may be associated with operations for converting coded symbols associated with a bit stream into a physical signal for transmission using communication media (e.g., a physical wire or radio). In aspects, the operational partitions of the physical layer may include, for processing upstream data traffic, CP 182A, FFT 183A, Demap 184A, Channel 185A, Eq 186A, Demod 187A, Descram 188A, Rate 189A, Decoding 190A, and CRC 191A. The physical layer may further include, for processing downstream data traffic, CRC 191B, Coding 190A, Rate 189B, Scram 188B, Mod 187B, Layer 186B, Precode 185B, Map 184B, iFFT 183B, and CP 182B.

Partitions in layer two 176 (media access control—MAC) may be associated with operations for transferring data frames between network hosts over a physical link. In aspects, partitions in layer two correspond to the data link layer in the OSI seven-layer model. Low-MAC 192 is the lowest partition in the layer two 176. Other partitions above the Low-MAC 192 include, an ascending sequence of layers, High-MAC 193, Low-Radio Link Control (RLC) 194, and High-RLC 195.

Partitions in the layer three 178 may be associated with operations for forwarding data packets through routers. In aspects, layer three 178 corresponds to the network layer in the OSI seven-layer model. The partitions in layer three 178 may be associated with protocol-governed operations such as Packet Data Convergence Protocol 196 (PDCP), Radio Resource Control 197A (RRC) and Service Data Adaptation Protocol 197B (SDAP).

In aspects, a combination of DU 112 and CU 118 in the far-edge data center 110 may process partitions associated with layer one 174, layer two 176, and at least a part of layer three 178. In particular, respective servers of RAN servers 116 include CPUs and a variety of accelerators for processing data associated with one or more partitions of the operational partitions 170. Use of an accelerator for processing a partition reduces a workload on the CPU. In aspects, the accelerators are heterogeneous. Some accelerators include pre-programmed logic for performing specific operational partitions. Some other accelerators are programmable. Some accelerators provide fast table lookups, while some other accelerators provide fast bit operations (e.g., graphics and video data).

The present disclosure dynamically allocates one or more accelerators for processing one or more partitions based on real-time utilization of processor resources imposed by data traffic. In particular, the disclosed technology monitors a level of workload by the CPU and accelerators, a level of workload needed to process the current data traffic, and types of operational partitions in need of enhanced resources. The RAN servers 116, based on the monitored levels, dynamically allocate one or more partitions to one or more accelerators for processing, thereby offloading tasks from the CPU.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
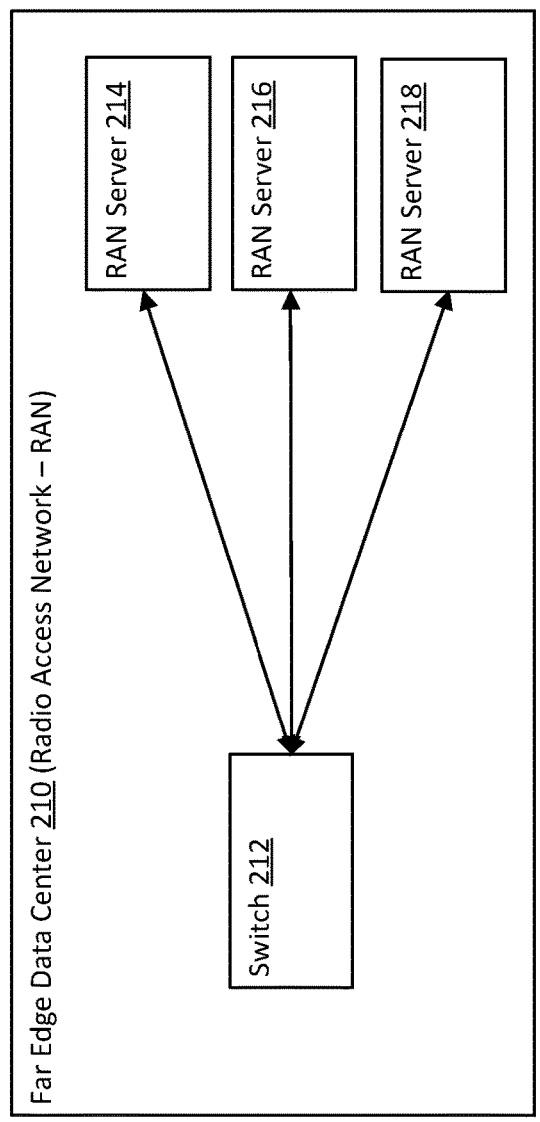
FIG. 2 illustrates an example of a far-edge data center of a RAN in accordance with aspects of the present disclosure.

FIG. 2 illustrates an example of a far-edge data center 210. The far-edge data center 210 at least includes a switch 212 and RAN servers 214-216. The switch 212 connects the cell towers (e.g., the cell towers 102A-C as shown in FIG. 1) with one or more of the RAN servers 214-216 of the far-edge data center 210. In aspects, the switch 212 is a programmable switch, which loads a program that instructs switching data traffic to a particular RAN server. Additionally or alternatively, the program may monitor data traffic at the switch 212.

The respective RAN servers 214-218 include CPUs and heterogeneous accelerators. For example, the heterogeneous accelerators may include one or more of ASIC-based programmable switches, ASIC-based network interface controllers (NICs), neural processing unit (NPU)-based NICs, field-programmable gate array (FPGA)-based NICs, and the like. Other types of heterogeneous accelerators include graphical processing unit (GPU) and FPGA-based graphics accelerators.

The disclosed technology dynamically assigns and periodically updates the assignment of the one or more partitions based on a level of demand for processing data traffic. For example, the disclosed technology dynamically allocates a pair of FPGA accelerators in the RAN server 214 for processing dynamically allocated coding/decoding partitions (e.g., decoding 190A and coding 190B of FIG. 1), thereby offloading the task from the CPU of the RAN server 214. In a predetermined period (e.g., every micro second), the disclosed technology updates dynamic allocations of cluster(s) and/or partitions based on a demand for processing resources based on the volume of data traffic. Additionally or alternatively, a cluster of heterogeneous accelerators may be allocated for executing service applications (e.g., a Quality of Service (QoS) service application evaluating telemetry or a video streaming service application processing video data). In aspects, instruction code for executing a service application is loadable onto a heterogeneous accelerator and the scheduler may set a processing priority as appropriate for the service application.

Additionally or alternatively, the disclosed technology enables execution of one or more programs by distinct accelerators of the heterogeneous accelerators without modifying the original instruction code of the one or more programs. In particular, the disclosed technology receives the original instruction code for the one or more programs and implements a set of application programming interfaces (APIs) that are common across the heterogeneous accelerators. Traditional RAN servers need program instructions that are specific for execution on particular accelerators. The disclosed technology converts the original instruction code of an application into sets of instruction code that is accelerator-specific. In aspects, distinct accelerators may accommodate instruction code that conforms to conditions set by the respective accelerators. For example, some accelerators receive instruction code written in a specific programming language (e.g., the Verilog language). The disclosed technology may the original instruction code of the service application or partition into accelerator-specific instructions by accessing the common interface, which maps functional blocks of the instruction code to accelerator-specific instruction code. In some other aspects, the disclosed technology translates accelerator-agnostic instruction code into accelerator-specific instruction code. Accordingly, the disclosed technology accommodates original instruction code that is independent from accelerators. The RAN server executes the original instruction code on respective accelerators of the heterogeneous accelerators offloading a task to the respective accelerators.

FIGS. 3A-B illustrate examples of a RAN server in accordance with the aspects of the present disclosure. FIG. 3A illustrates an example of the RAN server 300A with heterogeneous accelerators. The RAN server 300A includes a CPU 310, a set of GPUs 312A-C, FPGAs 314A-C, NPUs 316A-B, programmable switches 318A-B, and a network interface 308. Some accelerators in the set of heterogeneous accelerators may be pre-programmed for performing a specific task. For example, the FPGA 314A may be pre-programmed with code for decoding/coding of data (e.g., Decoding 190A and Coding 190B as shown in FIG. 1) in layer one. Some other accelerators may be programmable by loading a code that performs operations associated with a partition or a service application. The network interface 308 interfaces the CPU 310, the heterogeneous accelerators, the cell towers, and the near-edge data center (core network) for connecting with the cloud infrastructure and other RAN servers and switches.

In aspects, the CPU 310 monitors a workload level of the CPU 310 and respective accelerators. The CPU 310, based on the workload level, may offload a task being processed by the CPU 310 to one or more of the accelerators with available processing resources. In aspects, the CPU 310 allocates a cluster of accelerators for processing a task.

FIG. 3B illustrates an example 300B of a RAN server in accordance with aspects of the present disclosure. A RAN server 350 includes a system status receiver 352, a partition allocator 354, a cluster allocator 356 (in-server/cross-server clusters), and a scheduler 358. The system status receiver 352 receives status information about the CPU and one or more accelerators. In aspects, the status information may include an amount of available resources and workload for processing data on the CPU and the respective accelerators. The status information may also include a capability of each accelerator.

Based on the received status information, the partition allocator 354 dynamically allocates one or more partitions of the operational partitions for offload processing. For example, when the workload level of the CPU is above a predetermined threshold, the partition allocator 354 dynamically allocates a combination of Decoding 190A, Coding 190B, Cyclic Redundancy Check (CRC) 191A-B as a set of partitions for offloading from the CPU. In aspects, the partition allocator 354 may further allocate one or more service applications for offloading from the CPU. For example, the service applications may include a telemetry service, a video streaming service, a localization service, and a network monitoring service.

The cluster allocator 356 allocates a cluster of accelerators to process the dynamically allocated one or more partitions for offloading from the CPU. In aspects, a cluster of accelerators may include one or more accelerators of a same type or distinct types. The cluster may include accelerators associated with a RAN server. For example, the cluster allocator 356 may allocate a cluster of accelerators based on a combination of FPGA 314A and FPGA 314B for processing the dynamically allocated partition that includes Decoding 190A, Coding 190B, Cyclic Redundancy Check (CRC) 191A-B. Additionally or alternatively, the cluster may include heterogeneous accelerators across multiple RAN servers in the far-edge data center. In some other examples, the cluster allocator 356 may allocate a cluster of accelerators based on a combination of GPU 312A of the RAN server 300A and an FPGA in another RAN server (e.g., RAN server 214 or RAN server 216, as shown in FIG. 2).

The scheduler 358 schedules execution of operational tasks associated with the dynamically allocated partition(s) by the dynamically allocated accelerators. In this way, the scheduler 358 schedules offloading of processing by the CPU. In aspects, one of the RAN servers in the far-edge data center includes the scheduler 358. In some other aspects, more than one RAN server in the far-edge data center includes the scheduler 358 by forming a master-slave relationship and/or federation of schedulers. In aspects, the scheduler 358 may periodically update a task schedule. A time interval of the updates may be predetermined or dynamically change. For example, a predetermined time interval may be every microsecond. In aspects, a pattern of data traffic in the RAN may be in occasional bursts. The dynamic allocation of partitions and clusters and the periodic rescheduling of tasks increases efficient use of resources and improves performance of the RAN.

In aspects, the scheduler 358 also schedules tasks associated with service applications. The service applications may monitor and inspect data traffic and notify the cloud data center when volume of data traffic meets a predetermined condition. The scheduler 358 may schedule tasks by prioritizing processing of data traffic higher than the service applications.

FIGS. 4A-C illustrate examples of data structures for offloading tasks from the CPU to heterogeneous accelerators in accordance with the aspects of the present disclosure. FIG. 4A illustrates a table of programs 400A. The table of tasks includes a name of a task 402, a type 404 of the task, and one or more processors 406 (and accelerators) that accommodate executing the task. For example, the task Demodulation ("Demod") (e.g., the Demod 187A as shown in FIG. 1) has a type "Layer One," indicating that the task is an operational partition in the layer one. Either the CPU or the GPU may perform the task Demod in the RAN server. Availability of program code may determine types of processors and/or accelerators for a task. In aspects, some program code may only be available for execution by the CPU.

FIG. 4B illustrates an exemplar table 400B of processors and heterogeneous accelerators in a RAN server. Processor 420 includes a name of a processor or an accelerator. Task 422 indicates one or more tasks that have been assigned to the processor or the accelerator. Available workload 424 indicates a level of workload that is available for processing by the processor and/or the accelerator. Cluster 426 includes a cluster of accelerators.

For example, the CPU performs the general tasks (i.e., all tasks other than those offloaded to accelerators) and its available workload is at 40%. GPU (first) performs CRC and rate tasks of layer one and its available workload 424 is at 60%. FPGA (first) and FPGA (second) process the decoding/coding tasks as a cluster with an identifier "01." Available workload for both FPGAs is at 10%.

In aspects, the system status receiver (e.g., the system status receiver 352 as shown in FIG. 3B) receives status information associated with processors and accelerators and updates data in the table of processors and heterogeneous accelerators.

FIG. 4C illustrates an exemplar table 400C of status of processors and accelerators across multiple RAN servers in the far-edge data center. The table 400C includes server ID 440, processor 442, tasks 444, and cluster 446. In aspects, the table 400C indicates an example of a cross-server cluster of accelerators. The RAN server with an identifier 01 includes a CPU, a GPU (first), a GPU (second), an FPGA (first), and an FPGA (second). In particular, the FPGA (first) executes the demod/mod task of the layer one. The FPGA (second) executes the decoding/coding task of the layer one. The RAN server with an identifier 02 may include a CPU, a GPU (first), a GPU (second), and an FPGA (first). In particular, the FPGA (first) in the RAN server with an identifier 02 is in the same cluster with a cluster identifier 02 as the FPGA (second) in the RAN server with the identifier 01.

FIG. 5 is an example of a structure of program instructions with a common application programming interface in accordance with aspects of the present disclosure. Applications 550 include program instructions for service applications and tasks associated with operational partitions (e.g., the operational partitions 170 as shown in FIG. 1). A RAN layer one/layer two 502 is an application that performs a task associated with one or more partitions. A video streaming 504 streams a video as a service. A localization application 506 performs localization services based on location information of the cell towers and the mobile computing devices. A network monitoring application 508 monitors network as a service. The applications 550 use application programming interface 510 that is common across the heterogeneous accelerators in the RAN servers. By using the common interface 552, the RAN server executes the applications on one or more of the heterogeneous accelerators without a need to rewrite program instructions for specific accelerators.

The common interface 552 uses one or more functional blocks 554. The functional blocks 554 may be represented as an abstraction layer of functionalities provided by the heterogeneous accelerators. In aspects, the functional blocks 554 may include state store 512, which synchronizes states across the RAN servers. Caching 514 provides data caching features as specified by an application. Forward error correction 516 (FEC) provides FEC encoding and decoding to the application for controlling errors in data transmission. Crypto 518 provides data encryption and decryption. Synchronized time 520 provides synchronizing time among the heterogeneous accelerators across the RAN servers.

The functional blocks 554 map accelerator-neutral, functional code with accelerator-specific code. In aspects, programmable switch 530 includes code in C 538 language. FPGA-based NIC 532 includes either or both of C 540 and Verilog 542 (i.e., a hardware description language used for describing the FPGA-based NIC). NPU-based NIC 534 includes either or both of P4 544 and micro-C 546. CPU 536 includes code in C 548 language.

The disclosed technology enables executing an application by use of a programming interface that is common across the heterogeneous accelerators. Writing or developing an application for execution on a traditional accelerator required coding specific to the accelerator. The disclosed technology enables executing original program code of an application on heterogeneous accelerators by exposing an API which maps the program code to common accelerator functionality. In this way, execution of service applications may be dynamically offloaded to a special-purpose accelerator from the CPU. Unlike traditional systems with a need to write a distinct application for each accelerator, the disclosed technology leverages heterogeneous accelerators by writing an application once and execute the application on respective accelerators.

In aspects, different types of accelerators have distinct capabilities from one accelerator to another. For example, a switch at its core processes a data packet very fast (e.g., at terabits per second) and excels at simple table lookups. The switch also includes information associated with network-wide information (e.g., a queue length of processors for performing tasks). FPGA-based accelerators provide computing-intensive asks (e.g., crypto).

FIG. 6A is an example of a method for offloading tasks on a RAN server with heterogeneous accelerators in accordance with aspects of the present disclosure. A general order of the operations for the method 600A is shown in FIG. 6A. Generally, the method 600 begins with start operation 602 and ends with end operation 618. The method 600 may include more or fewer steps or may arrange the order of the steps differently than those shown in FIG. 6A. The method 600A can be executed as a set of computer-executable instructions executed by a computer system and encoded or stored on a computer readable medium. Further, the method 600A can be performed by gates or circuits associated with a processor, an ASIC, an FPGA, a SOC or other hardware device. Hereinafter, the method 600A shall be explained with reference to the systems, components, devices, modules, software, data structures, data characteristic representations, signaling diagrams, methods, etc., described in conjunction with FIGS. 1, 2, 3A-B, 4A-C, 5, 6B, 7, and 8A-B.

Following start operation 602, the method 600 begins with generate operation 604, which generates program instructions (e.g., a task program for processing partitions in the physical layer, a service application, and the like) using common interfaces for execution on the processors and the heterogeneous accelerators. The processors include a CPU. The heterogeneous accelerators include GPU and NIC and other accelerators based on ASIC, FPGA, and NPU, as examples. As detailed in FIG. 5, the disclosed technology enables writing a single program that is executable on the CPU and/or on one or more heterogeneous accelerators when the RAN server offloads select tasks from the CPU to one or a cluster of heterogeneous accelerators. The generate operation 604 corresponds to a part of operational steps in FIG. 6B, as indicated by an indication A.

Receive operation 606 receives status information about the processors and the heterogeneous accelerators. In aspects, the status information includes a level of available resources, the current workload, and processing capabilities for specific tasks.

Determine operation 608 determines (and/or allocates) a task for offloading from the CPU. For example, the task may be associated with a partition of operational partitions (e.g., the operational partitions 170 as shown in FIG. 1) or a service application. The determine operation 608 allocates a particular task based on the status information received at operation 606. For example, the determine operation 608 may offload the decoding/coding partition of layer one from the CPU when the current workload of the CPU surpasses a predetermined threshold. In aspects, the determine operation 608 may dynamically allocate and re-allocate tasks in a predefined time interval (e.g., a microsecond).

Based on status information received at operation 606, dynamically allocate operation 610 dynamically allocates one or more accelerators to execute the allocated task. In aspects, a cluster may include one or more processors or heterogeneous accelerators associated with the CPU of a RAN server. In some other aspects, the cluster may include processors and/or accelerators across multiple RAN servers. In aspects, the dynamically allocate operation 610 allocates the one or more accelerators for the allocated task based on its current workload and capability to perform the task. In aspects, the determine operation 608 dynamically allocates and re-allocates the accelerators in a predefined time interval (e.g., a microsecond). In further aspects, the dynamically allocate operation 610 may allocate a plurality of clusters of accelerators for tasks that are distinct. For example, a first cluster may include two FPGAs in a RAN server configured to process the Decoding/Coding partition of layer one. A second cluster may include two GPUs in distinct RAN servers, each GPU configured to process a video streaming service application.

Once a task is allocated for offloading to an allocated accelerator (or cluster of accelerators), schedule operation 612 schedules the dynamically allocated task for execution by the dynamically allocated cluster of accelerators. In aspects, the schedule operation 612 specifies a priority of performing the task by the respective accelerators based on real-time processing requirements for the task. For example, data protocol conversions by partitions in the operational partitions (e.g., the operational partitions 170 as shown in FIG. 1) need real-time processing to minimize data latency of the data traffic. In contrast, some of service applications (e.g., network monitoring) may need near real-time or non-real-time processing. The schedule operation 612 schedules tasks based on priority of the respective tasks.

Execute operation 614 executes the task using the allocated processors and/or the heterogeneous accelerators. In aspects, the execute operation 614 may include loading program instructions for executing the task as scheduled. In some aspects, the respective heterogeneous accelerators include a memory. Executing the task by an accelerator includes directly receiving data traffic onto the memory of the allocated accelerator without copying onto a memory associated with the CPU.

Update operation 616 updates the task scheduling on a periodic basis. For example, the scheduler may update its task schedule every microsecond. The method 600 ends with the end operation 618.

As should be appreciated, operations 602-618 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 6B is an example of a method for generating a programming code (e.g., instruction code) for execution on heterogeneous accelerators in accordance with aspects of the present disclosure. A general order of the operations for the method 600B is shown in FIG. 6B. Generally, the method 600B begins with start operation 650 and ends with end operation 664. The method 600B may include more or fewer steps or may arrange the order of the steps differently than those shown in FIG. 6B. The method 600B can be executed as a set of computer-executable instructions executed by a computer system and encoded or stored on a computer readable medium. Further, the method 600B can be performed by gates or circuits associated with a processor, an ASIC, an FPGA, a SOC or other hardware device. Hereinafter, the method 600B shall be explained with reference to the systems, components, devices, modules, software, data structures, data characteristic representations, signaling diagrams, methods, etc., described in conjunction with FIGS. 1, 2, 3A-B, 4A-C, 5, 6A, 7, and 8A-B.

Following start operation 650, the method 600 begins with receive operation 651, which receives a set of application code for executing on an RAN server. The set of application code may use an application programming interface (API) to perform functionalities that are available in the RAN server.

Identify operation 652, identifies common, accelerator-agnostic functional block(s) for performing a task. In aspects, the task may be associated with executing one or more operational partitions and/or with a executing a service application.

Determine operation 654 generates an accelerator-agnostic task instruction code that interfaces with the functional block(s). In aspects, an application programming interface (e.g., the Application Programming Interface 510 as shown in FIG. 5) provides the interface between the accelerator-agnostic task instruction code and the functional block(s). Building the accelerator-agnostic task instruction code may include building the API for the accelerator-agnostic task instruction code. In some other aspects, the determine operation 654 may map the accelerator-agnostic task instruction code to corresponding functional block(s). In some other aspects, the determine operation 654 may link the accelerator-agnostic task instruction code to the functional block(s) by creating a dynamic link library (DLL), for instance. Generating the accelerator-agnostic task instruction code interfaced with the identified one or more functional blocks may include building a dynamic link library (DLL). In yet some other aspects, the determine operation 654 combines at least the accelerator-agnostic task instruction code and functional block(s). In yet some other aspects, the disclosed technology includes a high-level programming language or framework to execute program instructions written according to the high-level programming language or framework across heterogeneous accelerators.

Identify operation 656 identifies an accelerator from a set of heterogeneous accelerators for executing the task instruction code. In aspects, respective accelerators require instruction code that is native or specific to the respective accelerators. For example, some accelerators require the instruction code to be written in a particular language (e.g., a FPGA-based NIC 532 needs instruction code written in either C 540 or in Verilog 542, as shown in FIG. 5). In aspects, the identify operation 656 takes place during a development phase for generating accelerator-specific task instruction code for respective accelerators. In other aspects, the identify operation 656 takes place during a development phase for mapping the accelerator-agnostic task instruction code to accelerator-specific task instruction code for respective accelerators. In still other aspects, the identify operation 656 takes place on the RAN servers by accessing an abstraction interface in preparation for scheduling a task for offloading to an allocated accelerator of a particular type.

Translate operation 658 translates the accelerator-agnostic task instruction code into an accelerator-specific executable based on the functional blocks. In aspects, the translating into the accelerator-specific executable includes mapping accelerator-agnostic task instruction code for the functional blocks to accelerator-specific task instruction code, e.g., via the DLL generated based on the functional blocks. Generating the accelerator-specific executable may include accessing an API. Translating into the accelerator-agnostic task instruction code interfaced with the identified one or more functional blocks may include accessing the CPI. In some other aspects, translating into the accelerator-specific executable includes translating the accelerator-agnostic task instruction code into the programming code that is specific to (e.g., native to) the identified accelerator. In aspects, the translate operation 658 accesses the accelerator-specific executable based on the accelerator-agnostic task instruction code. In some aspects, a layer of abstraction (e.g., an API) may facilitate the mapping or the translating. In aspects, the series of operation steps from the receive operation and the translate operation 658, as grouped by an indicator A, correspond to the indicator A as shown in FIG. 6A. In some other aspects, an accelerator-specific compiler program of the high-level programming language or framework may compile the accelerator-agnostic task instruction code and generates accelerator-specific task instructions.

Load operation 660 loads the accelerator-specific executable onto the accelerator for offloading a workload associated with the task from the CPU.

Schedule operation 662 schedules and executes the accelerator-specific executable on the accelerator. The method 600B ends with the end operation 664.

As should be appreciated, operations 650-664 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the at least one processing unit 702, the program tools 706 (e.g., an application 720) may perform processes including, but not limited to, the aspects, as described herein. The application 720 includes a system status receiver 722, a partition allocator 724, a cluster allocator 726, and a scheduler 728, as described in more detail with regard to FIG. 1. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of the communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., as an operator of servers in the far-edge data center in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., the RAN servers 116 and the servers 134, and other servers as shown in FIG. 1), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world" via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for generating instruction code for a plurality of accelerators for execution on one or more radio access network (RAN) servers in a RAN according to at least the examples provided in the sections below. The method comprises receiving a set of application code via an application programming interface (API); identifying, based on the set of application code, one or more common functional blocks for performing a task, wherein the task is associated with processing data traffic in the RAN; determining generating accelerator-agnostic task instruction code, wherein the accelerator-agnostic task instruction code corresponds to the identified one or more common functional blocks; identifying an accelerator for performing the task from a set of heterogeneous accelerators associated with one or more RAN servers; translating generating an accelerator-specific executable based at least on the accelerator-agnostic task instruction code into an accelerator-specific executable, wherein the accelerator-specific executable is executable on the identified accelerator; scheduling the accelerator-specific executable to offload processing of the set of application code from a central processor to the identified accelerator; and causing the identified accelerator to execute the accelerator-specific executable for performing the task. The generating the accelerator-agnostic task instruction code interfaced with the identified one or more common functional blocks comprises building the API. The generating the accelerator-specific executable comprises accessing the API. The generating the accelerator-agnostic task instruction code interfaced with the identified one or more common functional blocks comprises building a dynamic link library (DLL). The generating the accelerator-specific executable comprises accessing the DLL. The method further comprises receiving status information indicating a first workload of a central processor of one of the one or more RAN servers; receiving status information indicating a second workload of the plurality of accelerators associated with the one or more RAN servers; and identifying, based on the received status information, the accelerator from the plurality of accelerators. The plurality of accelerators is heterogeneous accelerators. The plurality of heterogeneous accelerators includes two or more of: an ASIC-based network interface card, an FPGA-based network interface card, an NPU-based network interface card, a GPU, an FPGA-based accelerator, or an NPU-based accelerator. The RAN is associated with a far edge data center of a cloud RAN infrastructure.

Another aspect of the technology relates to a system for generating instruction code for a cluster of accelerators for execution on one or more radio access network (RAN) servers in a RAN. The system comprises a processor; and a memory storing computer-executable instructions that when executed by the processor cause the system to: receive a set of application code via an application programming interface (API); identify, based on the set of application code, one or more common functional blocks for performing a task, wherein the task is associated with processing data traffic in the RAN; determining generate accelerator-agnostic task instruction code, wherein the accelerator-agnostic task instruction code corresponds to interfaces with the identified one or more common functional blocks; identify an accelerator for performing the task from a set of heterogeneous accelerators associated with one or more RAN servers; translate generate an accelerator-specific executable based at least on the accelerator-agnostic task instruction code into an accelerator-specific executable, wherein the accelerator-specific executable is executable on the identified accelerator; schedule the accelerator-specific executable to offload processing of the set of application code from a central processor to the identified accelerator; and cause the identified accelerator to execute the accelerator-specific executable for performing the task. The generating the accelerator-agnostic task instruction code interfaced with the identified one or more common functional blocks comprises building the API. The computer-executable instructions when executed further causing the system to: receive status information indicating a first workload of a central processor of one of the one or more RAN servers; receive status information indicating a second workload of the cluster of accelerators associated with the one or more RAN servers; and identify, based on the received status information, the accelerator from the cluster of accelerators. The cluster of heterogeneous accelerators include two or more of: an ASIC-based network interface card, an FPGA-based network interface card, an NPU-based network interface card, a GPU, an FPGA-based accelerator, or an NPU-based accelerator. The task corresponds to execution of a service application in the one or more RAN servers, wherein the service application includes one of: video streaming, location tracking, or network monitoring. The one or more common functional blocks include one or more of: a state store, a caching, a forward error correction (FEC), a data encryption, a data decryption, or a time synchronization.

In still further aspects, the technology relates to a computer-readable recording medium storing computer-executable instructions. The computer-executable instructions when executed by a processor cause a computer system receive a set of application code via an application programming interface (API); identify, based on the set of application code, one or more common functional blocks for performing a task, wherein the task is associated with processing data traffic in the RAN; determine generate accelerator-agnostic task instruction code, wherein the accelerator-agnostic task instruction code corresponds to interfaces with the identified one or more common functional blocks; identify an accelerator for performing the task from a set of heterogeneous accelerators associated with one or more RAN servers; translate generate an accelerator-specific executable based at least on the accelerator-agnostic task instruction code into an accelerator-specific executable, wherein the accelerator-specific executable is executable on the identified accelerator; schedule the accelerator-specific executable to offload processing of the set of application code from a central processor to the identified accelerator; and cause the identified accelerator to execute the accelerator-specific executable for performing the task. The computer-executable instructions when executed further causing the system to: receive status information indicating a first workload of a central processor of one of the one or more RAN servers; receive status information indicating a second workload of the cluster of accelerators associated with the one or more RAN servers; and identify, based on the received status information, the accelerator from the cluster of accelerators.

Any of the one or more above aspects in combination with any other of the one or more aspect. Any of the one or more aspects as described herein.

What is claimed is:

1. A computer-implemented method for generating instruction code for a plurality of accelerators for execution on one or more radio access network (RAN) servers in a RAN, a method comprising:
 receiving, by a RAN server of the one or more RAN servers, a set of application code, wherein the set of application code performs a task of the RAN server using an application programming interface (API), wherein the API includes mapping of accelerator-agnostic task instruction codes associated with the task of the RAN server into accelerator-specific executables associated with one or more accelerators of the plurality of accelerators in the one or more RAN servers according to one or more common functional blocks for performing the task, wherein the one or more common functional blocks represented as an abstraction layer of functionalities provided by the plurality of accelerators;

identifying, based on the set of application code, a common functional block of the one or more common functional blocks for performing the task of the RAN server;

identifying, based on the identified common functional block, an accelerator for performing the task from the plurality of accelerators in the one or more RAN servers;

translating, based on the mapping of the API, an accelerator-agnostic task instruction code into an accelerator-specific executable, wherein the accelerator-specific executable is executable on the identified accelerator;

scheduling, based on a workload associated with a central processor of the RAN server, the accelerator-specific executable associated with the identified accelerator to offload processing of the set of application code from the central processor of the RAN server of the one or more RAN servers to the identified accelerator; and causing the identified accelerator to execute the accelerator-specific executable for performing the task.

2. The computer-implemented method of claim 1, further comprising:

generating the API based on the accelerator-agnostic task instruction code, the accelerator-agnostic task instruction code interfaces with the identified common functional block, and wherein the one or more common functional blocks map the accelerator-agnostic task instruction code with an accelerator-specific executable associated with processing data traffic in real-time according to a physical layer of an Open Systems Interconnection model.

3. The computer-implemented method of claim 2, wherein the translating the accelerator-agnostic task instruction code into the accelerator-specific executable comprises accessing the API.

4. The computer-implemented method of claim 1, wherein the accelerator-agnostic task instruction code interfaces with the identified common functional block of the identified one or more common functional blocks.

5. The computer-implemented method of claim 4, wherein the translating the accelerator-agnostic task instruction code into the accelerator-specific executable comprises accessing a dynamic link library (DLL).

6. The computer-implemented method of claim 1, the method further comprising:

receiving status information indicating a first workload of the central processor of the RAN server of the one or more RAN servers;

receiving status information indicating a second workload of the plurality of accelerators associated with the one or more RAN servers; and identifying, based on the received status information, the accelerator from the plurality of accelerators.

7. The computer-implemented method of claim 6, wherein the plurality of accelerators are heterogeneous accelerators.

8. The computer-implemented method of claim 7, wherein the plurality of accelerators includes two or more of:

an ASIC-based network interface card,
an FPGA-based network interface card,
an NPU-based network interface card,
a GPU,
an FPGA-based accelerator, or
an NPU-based accelerator.

9. The computer-implemented method of claim 1, wherein the task corresponds to processing one or more operational partitions associated with processing data traffic in the RAN, wherein an operational partition of the one or more operational partitions is associated with a physical layer of an Open Systems Interconnection model.

10. The computer-implemented method of claim 1, wherein the task corresponds to execution of a service application in the one or more RAN servers, wherein the service application includes one of:

video streaming,
location tracking, or
network monitoring.

11. The computer-implemented method of claim 1, wherein the one or more common functional blocks include one or more of:

a state store,
a caching,
a forward error correction (FEC),
a data encryption,
a data decryption, or
a time synchronization.

12. The computer-implemented method of claim 1, where the RAN is associated with a far edge data center of a cloud RAN infrastructure.

13. A system for generating instruction code for a cluster of accelerators for execution on one or more radio access network (RAN) servers in a RAN, the system comprising:

a processor; and
a memory storing computer-executable instructions that when executed by the processor cause the system to:

receive, by a RAN server of the one or more RAN servers, a set of application code, wherein the set of application code performs a task of the RAN server using an application programming interface (API), wherein the API includes mapping of accelerator-agnostic task instruction codes associated with the task of the RAN server into accelerator-specific executables associated with one or more accelerators of a plurality of accelerators in the one or more RAN servers according to one or more common functional blocks for performing the task, wherein the one or more common functional blocks represented as an abstraction layer of functionalities provided by the plurality of accelerators;

identify, based on the set of application code, a common functional block of the one or more common functional blocks for performing the task of the RAN server;

identify, based on the identified common functional block, an accelerator for performing the task from the plurality of accelerators in the one or more RAN servers;

translate, based on the mapping of the API, an accelerator-agnostic task instruction code into an accelerator-specific executable, wherein the accelerator-specific executable is executable on the identified accelerator;

schedule, based on a workload associated with a central processor of the RAN server, the accelerator-specific executable associated with the identified accelerator to offload processing of the set of application code from the central processor of the RAN server of the one or more RAN servers to the identified accelerator; and cause the identified accelerator to execute the accelerator-specific executable for performing the task.

14. The system of claim 13, wherein the translating the accelerator-agnostic task instruction code further comprises building the API, and the accelerator-agnostic task instruction code interfaces with the one or more common functional blocks, and wherein the one or more common functional blocks map the accelerator-agnostic task instruction code with an accelerator-specific executable associated with processing data traffic in real-time according to a physical layer of an Open Systems Interconnection model.

15. The system of claim 13, the computer-executable instructions when executed further causing the system to:
receive status information indicating a first workload of the central processor of the RAN server of the one or more RAN servers;
receive status information indicating a second workload of the cluster of accelerators associated with the one or more RAN servers; and
identify, based on the received status information, the accelerator from the cluster of accelerators.

16. The system of claim 13, wherein the cluster of accelerators include two or more of:
an ASIC-based network interface card,
an FPGA-based network interface card,
an NPU-based network interface card,
a GPU,
an FPGA-based accelerator, or
an NPU-based accelerator.

17. The system of claim 13, wherein the task corresponds to execution of a service application in the one or more RAN servers, wherein the service application includes one of:
video streaming,
location tracking, or
network monitoring.

18. The system of claim 13, wherein the one or more common functional blocks include one or more of:
a state store,
a caching,
a forward error correction (FEC),
a data encryption,
a data decryption, or
a time synchronization.

19. A computer-readable storage medium storing computer- executable instructions that when executed by a processor cause a computer system to:
receive, by a RAN server of the one or more RAN servers, a set of application code, wherein the set of application code performs a task of the RAN server using an application programming interface (API), wherein the API includes mapping of accelerator-agnostic task instruction codes associated with the task of the RAN server into accelerator-specific executables associated with one or more accelerators of a plurality of accelerators in the one or more RAN servers according to one or more common functional blocks for performing the task, wherein the one or more common functional blocks represented as an abstraction layer of functionalities provided by the plurality of accelerators;
identify, based on the set of application code, a common functional block of the one or more common functional blocks for performing the task of the RAN server;
identify, based on the identified common functional block, an accelerator for performing the task from the plurality of accelerators in the one or more RAN servers;
translate, based on the mapping of the API, an accelerator-agnostic task instruction code into an accelerator-specific executable, wherein the accelerator-specific executable is executable on the identified accelerator;
schedule, based on a workload associated with a central processor of the RAN server, the accelerator-specific executable associated with the identified accelerator to offload processing of the set of application code from the central processor of a RAN server of the one or more RAN servers to the identified accelerator; and
cause the identified accelerator to execute the accelerator-specific executable for performing the task.

20. The computer-readable storage medium of claim 19, the computer-executable instructions when executed further causing the system to:
receive status information indicating a first workload of the central processor of the RAN server of the one or more RAN servers;
receive status information indicating a second workload of a cluster of accelerators associated with the one or more RAN servers;
building, based on the accelerator-agnostic task instruction code, the API, wherein the accelerator-agnostic task instruction code interfaces with the identified one or more common functional blocks, and wherein the one or more common functional blocks map the accelerator-agnostic task instruction code with an accelerator-specific code associated with processing data traffic in real-time according to a physical layer of an Open Systems Interconnection model; and
identify, based on the received status information, the accelerator from the cluster of accelerators.

\* \* \* \* \*